Patented Mar. 7, 1939

2,149,732

UNITED STATES PATENT OFFICE 2,149,732

COMPOSITE MOLDED ARTICLE AND PROCESS FOR MAKING THE SAME

Frazier Groff, Charleston, W. Va., assignor, by mesne assignments, to Union Carbide and Carbon Corporation, a corporation of New York No Drawing. Application July 15, 1931, Serial No. 551,062

11 Claims. (Cl. 154—2)

This invention pertains to composite molded articles including a metallic portion and a portion containing polymerization products of vinyl compounds. These polymerization products will be referred to as vinyl resins in the specification and claims.

Vinyl compounds can be polymerized to form resinous products, and it is known that these resins are thermoplastic and may be molded. Resins resulting from the polymerization of a mixture of vinyl chloride and vinyl acetate containing 70% to 95% vinyl chloride and 5% to 30% vinyl acetate and which are not more than 30% soluble in cold (20° to 30° C.) toluene are preferred for most applications. I prefer to insure complete stability of the vinyl resins by incorporating with them a small amount of a basic substance having no acid-forming or oxidizing groups in its composition, such as alkaline earth metal salts of fatty acids or natural and artificial acid resins. It is usually desirable to add a fluxing agent, such as carnauba wax, with the stabilizing substance. The present invention is not restricted to this preferred vinyl resin, and other types of vinyl resins may be used.

The production of large articles from vinyl resins or from other plastics has never been extensively carried out because the mechanical strength of these plastics is insufficient to adapt them to such purposes. This fact suggests the use of reenforcing members composed, for example, of metals, and the use of such members has been attempted but has never been successfully accomplished with plastics, particularly with those of the thermo-setting type. One of the primary reasons for the failure of metal and plastic composites as heretofore fabricated has been the lack of adhesion between the plastics and the reenforcement, or, if the plastic did adhere to the reenforcement, internal strains were developed which rendered the composite article sensitive to impact shock and subject to breakage as, for example, by delamination or by cracking of the surface. This explains why metal and plastic composite articles as heretofore prepared cannot be satisfactorily sawed, cut, nailed or worked in the degree desirable in such materials.

The principal object of my invention is to provide a process for making molded composite articles in which vinyl resins are associated with metallic reenforcing members. Another object is to provide molded composite articles, including vinyl resins and metallic portions, which are workable as structural materials. Still another object is to provide a process for making molded composite articles from vinyl resins and metal inserts.

I have found by experimentation that vinyl resin compositions and metals may be molded together into composite articles which possess definitely advantageous properties and which are free from many of the disadvantages possessed by composite articles formed from other plastics and metals. Vinyl resins and metals may be molded together into composite articles which are not unduly fragile and which possess good tensile, transverse and impact strengths. Upon investigation I have found that vinyl resin compositions, when molded and cooled, shrink in an amount approximately equal to or less than the contraction exhibited by iron and steel and the common metals when cooled over the same temperature range. By way of comparison, I have discovered that plastics of the thermo-setting type shrink to a much greater extent under the same conditions. In a particular case the shrinkage of a phenol-methylene resin plastic was found to be nearly ten times as great as that of a vinyl resin plastic when both were molded and cooled under similar conditions. For this reason my invention produces molded composites including a metallic portion and a vinyl resin portion which are superior to reenforced plastic composites previously known.

It is possible to surface metals with vinyl resin compositions to produce a novel structural material which possesses good heat, electrical and sound insulating properties and which is chemically inert. The inflammability of the resultant structural material is negligible as is shown by the fact that a vinyl resin composition containing 45% cellulosic filler and 55% vinyl resin will not support combustion.

I have found that metals surfaced with vinyl resin are unaffected by foodstuffs, medicinal and pharmaceutical preparations and many chemicals, including 35% nitric acid, 30% sodium hydroxide solutions, and such organic solvents as alcohol, glycol, glycerine, and the like. Vinyl resins are odorless and do not convey objectionable tastes, colors or odors to foodstuffs and the like with which they may be contacted.

It will be understod that the material of my invention may be given many ornamental or useful finishes. It may be colored and grained to resemble wood, and special effects may be obtained by incorporating in the molded composite a layer of lithographed or similarly decorated paper in or on the surface of the vinyl composition. The vinyl resin compositions may be produced in all colors and these colors are permanent except when exposed to actinic light for a considerable period of time.

It is possible to produce structural materials comprising a metal portion and a vinyl resin portion which may be cut, sawed, stamped, drilled and nailed. If a suitable reenforcing member is chosen, the composite may be warmed to about 100° C. and bent or formed into a variety of shapes, without delamination, cracking of the surface, or other form of breakage.

One of the advantages of my invention is the fact that the vinyl resin compositions used therein may be repeatedly remolded. The material is almost permanently thermoplastic and this presents an economical advantage by permitting damaged or defective articles, as well as scrap material, to be reclaimed without loss.

Various sizing materials may be used in conjunction with the vinyl resins to prepare the metal surface for the application of the resin and to increase the adhesion of the vinyl resin to the metal. For example paracumarone resin, thermoplastic, adhesive rubber derivatives and the glyptal type resins may be used for this purpose. These may be conveniently applied in solution as a varnish or as an ingredient of a vinyl resin undercoating solution. The metals may be treated by other methods to secure better bonding between the vinyl resin composition and the metal. For example, the metal surface may be acid-etched before applying the vinyl resin, or the base metal may be plated with another metal to which the vinyl resin may be made to adhere more securely than to the base metal, or it may be both etched and plated.

In addition to molded composite articles consisting only of vinyl resin compositions and metals, my invention contemplates the formation of composites comprising metals, a fibrous layer and a vinyl resin; metal foil, a fibrous layer and a vinyl resin; and metal and vinyl resin composites which include as an incidental portion, a layer of paper or other cellulosic material.

The invention is illustrated by the following examples:

I. A metal plate was cleaned and sized with a solution of thermoplastic, adhesive rubber derivatives in benzene. After drying, a vinyl resin composition was applied to the sized sheet and the whole was molded in a press at about 130° C. and with a pressure of about 2000 pounds per square inch. The vinyl resin composition was made up as follows:

| | Parts |
|---|---|
| Vinyl resin | 70 |
| Wax | 1 |
| Coloring matter | 1 to 4 |
| Cellulosic filler | 28 to 25 |

It is obvious that the properties of the finished material will be altered by altering the composition. For example, if the cellulosic filler content is increased, the water resistance of the product is decreased and vice versa. The vinyl resin composition may be applied as a preformed sheet or as a molding powder. The products formed in accordance with this example may be cut, nailed or worked in the usual way as structural materials. If it is desired, the metal may be surfaced with the vinyl resin composition on both sides. The product may be warmed, and while hot it may be bent or shaped as desired.

The procedure of this example may be varied by spreading the vinyl resin composition in powdered form over the sized metal sheet which is warmed so that it will adhere thereto, whereby a preformed stock is obtained. The preformed stock may then be converted by molding operations into the composite article having a smooth plane surface.

II. The procedure described in Example I was followed in surfacing metals with the exception that a sheet of paper, previously impregnated with a vinyl resin, was placed over the sized surface and the vinyl resin composition was then applied to this sheet, either as a powder or in sheet form. This procedure minimizes the possibility of the vinyl composition scrubbing off the sizing material during molding, and lessens the tendency of the product to become brittle at the edges. If it is desired a plurality of vinyl resin impregnated sheets of paper may be used instead of the powdered or sheeted molding composition. Special finishes may be imparted to the finished composite article by using as the top layer in this process, a lithographed or a similarly ornamented sheet of impregnated paper.

III. Special laminated articles may be formed which include a preformed layer of fibrous material, a metallic reenforcement and a vinyl resin composition surface. For example, a portion of pulp board was impregnated with a vinyl resin solution and dried. The impregnated base was then surfaced with a vinyl resin composition and molded against a sized metallic sheet. The metallic surface was then covered with a vinyl resin composition as described in the preceding examples to yield a composite of comparatively low density possessing the resistance of the vinyl resin and reenforced with the metallic sheet.

Similarly, molded composites may be formed of a flexible fibrous sheet, metal foil and a vinyl resin composition. These composites may be formed in accordance with the procedure of Example II, and are useful as vapor and gas impervious sheets possessing water-resisting and heat and electrical insulating properties.

IV. In some instances better adhesion between the vinyl resin composition and the metal may be obtained by etching the metal. For example, vinyl resin compositions may be molded directly against steel plates which have been etched with nitric acid, freed from the acid and dried. The plates may be etched and then plated with copper; for example, by immersion in a copper sulfate solution. This plated surface is then sized with a vinyl resin and baked before the vinyl resin molding composition is applied. A very hard adhesive coating is thus obtained.

V. Perforated metal sheets may be treated by any of the foregoing methods to produce composites which are somewhat lighter in weight than those prepared from solid metal sheets. The adhesion obtained on perforated metal stock is very good.

VI. Metal reenforcing strips, rods or sheets are placed within molds used for the production of molded objects. The vinyl resin composition is then charged into the mold and molded in the usual manner. The resulting product is stronger than the unreenforced plastic and is practically free from strains, warpage or cracking. Improved adhesion may be obtained by treating the metal reenforcement with a priming or sizing material before molding. The metal insert may be partly or entirely surrounded by the vinyl resin as desiired. For example, tool handles or similar articles may be formed comprising a portion surfaced with vinyl resin and a metal portion extending therefrom.

As an example of this type of composite articles, an automobile steering wheel was prepared from metal in a skeleton form comprising a spider and rim. This was placed in a mold shaped to conform to the size of the finished wheel. The mold was heated to about 130° C. and a vinyl resin molding compound was charged into the mold and about 2000 pounds per square inch of pressure was applied. A molded composite steering wheel was obtained composed of the vinyl resin composition reenforced by the contained metal insert.

The new materials of my invention are adapted to many uses, for example, furniture construction, interior and exterior building trim, wall or floor covering materials, ornamental objects, and for various types of heat insulation; other uses will be apparent.

I claim:—

1. A laminated product capable of being bent without delamination of the layers or cracking of the surface, comprising fibrous sheet material impregnated with a thermoplastic resin securely united to a metal sheet of substantial thickness and rigidity.

2. A laminated product capable of being bent without delamination of the layers or cracking of the surface, comprising a plurality of superposed fibrous sheets impregnated with a thermoplastic resin consolidated together and securely united to a metal sheet of substantial thickness and rigidity.

3. A laminated product capable of being bent without delamination of the layers or cracking of the surface, comprising fibrous sheet material impregnated with a thermo-plastic resin securely united to a metal sheet of substantial thickness and rigidity, said fibrous sheet material being coated with a lustrous resin.

4. A laminated product capable of being bent without delamination of the layers or cracking of the surface, comprising a plurality of superposed fibrous sheet material impregnated with a thermo-plastic resin consolidated together and securely united to a metal sheet of substantial thickness and rigidity, said fibrous sheet material being coated with a lustrous resin.

5. A laminated product capable of being bent without delamination of the layers or cracking of the surface, comprising fibrous sheet material impregnated with a thermo-plastic resin united to a layer of compressible material which is united to a metal sheet of substantial thickness and rigidity.

6. A laminated product capable of being bent without delamination of the layers or cracking of the surface, comprising fibrous sheet material impregnated with a thermo-plastic resin united to a layer of compressible material which is united to a metal sheet of substantial thickness and rigidity, said fibrous sheet material being coated with a lustrous resin.

7. A laminated sheet comprising a first lamination of porous metal foil, and a second lamination of tenacious flexible substantially transparent material extending into the pores of the metal foil.

8. A laminated sheet comprising a porous lamination of metal foil, and laminations of tenacious flexible substantially transparent material extending into and through the pores of the foil sheet.

9. That process of making a laminated material which comprises the steps of preparing metal foil with minute perforations therethrough, applying thereto a sheet of material which is plastic upon being heated, and pressing the foil and material together while applying heat sufficient to render such material plastic.

10. A laminated, composite molded article substantially free from strains and capable of being bent without delamination of the layers or cracking of the surface, comprising a metal sheet of substantial thickness and rigidity having at least one porous surface and a vinyl resin composition forming a surface of said article and adhering securely to said surface of the metal sheet.

11. A laminated, composite molded article substantially free from strains and capable of being bent without delamination of the layers or cracking of the surface, comprising a metal sheet of substantial thickness and rigidity having at least one porous surface and a vinyl resin composition forming a surface of said article and adhering securely to said surface of the metal, said vinyl resin being substantially identical with the conjoint polymer of a vinyl halide and a vinyl ester of an organic acid.

FRAZIER GROFF.